(12) United States Patent
Sanderovich et al.

(10) Patent No.: US 10,247,808 B2
(45) Date of Patent: Apr. 2, 2019

(54) LOCATION REPORTING FOR EXTREMELY HIGH FREQUENCY (EHF) DEVICES

(71) Applicant: QUALCOMM Incorporated, San Diego, CA (US)

(72) Inventors: Amichai Sanderovich, Atlit (IL); Carlos Horacio Aldana, Mountain View, CA (US); Xiaoxin Zhang, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 14/992,857

(22) Filed: Jan. 11, 2016

(65) Prior Publication Data

US 2016/0202344 A1    Jul. 14, 2016

Related U.S. Application Data

(60) Provisional application No. 62/102,588, filed on Jan. 12, 2015.

(51) Int. Cl.
*H04W 4/00* (2018.01)
*G01S 5/06* (2006.01)
(Continued)

(52) U.S. Cl.
CPC ............. *G01S 5/06* (2013.01); *G01S 5/0205* (2013.01); *H04B 7/0617* (2013.01); *H04B 7/086* (2013.01); *H04W 64/006* (2013.01)

(58) Field of Classification Search
CPC .............................. H04B 7/0617; H04W 64/00
See application file for complete search history.

(56) References Cited

U.S. PATENT DOCUMENTS

2013/0188538 A1*  7/2013  Kainulainen ............. G01S 3/48
                                                              370/310
2014/0004877 A1   1/2014  Van et al.
(Continued)

OTHER PUBLICATIONS

Badawy A., et al., "A Simple Angle of Arrival Estimation Scheme", Sep. 1, 2014 (Sep. 1, 2014), 8 Pages, XP055327377, Retrieved from the Internet: URL: https://www.researchgate.net/profile/Tarek_ElFouly/publication/265908663_A_Simple_AoA_Estimation_Scheme/links/54bce2e20cf29e0cb04c528a.pdf?origin=publication_detail [retrieved on Dec. 8, 2016].

(Continued)

*Primary Examiner* — Omoniyi Obayanju
(74) *Attorney, Agent, or Firm* — Patterson & Sheridan, LLP

(57) ABSTRACT

Certain aspects of the present disclosure relate to location reporting for extremely high frequency (EHF) devices. Certain aspects of the present disclosure provide an apparatus for wireless communications. The apparatus generally includes a transmit interface configured to output a first frame for transmission to another apparatus at a first time, a receive interface configured to obtain, at a second time, a second frame transmitted by the other apparatus in response to the first frame, and a processing system configured to generate a third frame for transmission to the other apparatus via the transmit interface, the third frame including information indicating a difference between the first time and the second time and an indication of at least one of an angle of departure of the first frame or an angle of arrival of the second frame.

31 Claims, 15 Drawing Sheets

(51) Int. Cl.
  *G01S 5/02*   (2010.01)
  *H04B 7/06*   (2006.01)
  *H04B 7/08*   (2006.01)
  *H04W 64/00*  (2009.01)

(56) References Cited

U.S. PATENT DOCUMENTS

| | | |
|---|---|---|
| 2014/0073352 A1 | 3/2014 | Aldana et al. |
| 2014/0335891 A1 | 11/2014 | Zhang et al. |
| 2016/0100287 A1* | 4/2016 | Thornycroft ........ H04W 40/244 455/456.1 |
| 2016/0366548 A1* | 12/2016 | Wang .................... H04W 64/00 |

OTHER PUBLICATIONS

International Search Report and Written Opinion—PCT/US2016/012975—ISA/EPO—dated Apr. 8, 2016.

* cited by examiner

LOCATION REPORTING FOR EXTREMELY HIGH FREQUENCY (EHF) DEVICES

CLAIM OF PRIORITY UNDER 35 U.S.C. § 119

The present application for Patent claims benefit of U.S. Provisional Patent Application Ser. No. 62/102,588, filed Jan. 12, 2015 and assigned to the assignee hereof and hereby expressly incorporated by reference herein.

BACKGROUND

Field of the Disclosure

Certain aspects of the present disclosure generally relate to wireless communications and, more particularly, to location reporting, for example, for extremely high frequency (EHF) devices.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure generally relate to location reporting, for example, for extremely high frequency (EHF) devices.

Certain aspects of the present disclosure provide an apparatus for wireless communications. The apparatus generally includes a transmit interface configured to output a first frame for transmission to another apparatus at a first time, a receive interface configured to obtain, at a second time, a second frame transmitted by the other apparatus in response to the first frame, and a processing system configured to generate a third frame for transmission to the other apparatus via the transmit interface, the third frame including information indicating a difference between the first time and the second time and an indication of at least one of an orientation of departure of the first frame or an orientation of arrival of the second frame.

Certain aspects of the present disclosure provide an apparatus for wireless communications. The apparatus generally includes a transmit interface configured to output a first frame for transmission to another apparatus in response to a second frame received from the other apparatus, a receive interface configured to obtain a third frame transmitted by the other apparatus in response to the first frame, the third frame including information indicating a difference between a first time that the first frame was received by the other apparatus and a second time that the second frame was transmitted by the other apparatus and an indication of at least one of an orientation of departure of the second frame or an orientation of arrival of the first frame, and a processing system configured to estimate a location of the apparatus relative to the other apparatus based, at least in part, on the difference between the first time and the second time and at least one of the orientation of departure of the second frame or the orientation of arrival of the first frame.

Certain aspects of the present disclosure provide a method for wireless communications. The method generally includes outputting, by an apparatus, a first frame for transmission to another apparatus at a first time, obtaining, at a second time, a second frame transmitted by the other apparatus in response to the first frame, and generating a third frame for transmission to the other apparatus via the transmit interface, the third frame including information indicating a difference between the first time and the second time and an indication of at least one of an orientation of departure of the first frame or an orientation of arrival of the second frame.

Certain aspects of the present disclosure provide a method for wireless communications. The method generally includes outputting, by an apparatus, a first frame for transmission to another apparatus in response to a second frame received from the other apparatus, obtaining a third frame transmitted by the other apparatus in response to the first frame, the third frame including information indicating a difference between a first time that the first frame was received by the other apparatus and a second time that the second frame was transmitted by the other apparatus and an indication of at least one of an orientation of departure of the second frame or an orientation of arrival of the first frame, and estimating a location of the apparatus relative to the other apparatus based, at least in part, on the difference between the first time and the second time and at least one of the orientation of departure of the second frame or the orientation of arrival of the first frame.

Certain aspects of the present disclosure provide an apparatus for wireless communications. The apparatus generally includes means for outputting, by an apparatus, a first frame for transmission to another apparatus at a first time, means for obtaining, at a second time, a second frame transmitted by the other apparatus in response to the first frame, and means for generating a third frame for transmission to the other apparatus via the transmit interface, the third frame including information indicating a difference between the first time and the second time and an indication of at least one of an orientation of departure of the first frame or an orientation of arrival of the second frame.

Certain aspects of the present disclosure provide an apparatus for wireless communications. The apparatus generally includes means for outputting, by an apparatus, a first frame for transmission to another apparatus in response to a second frame received from the other apparatus, means for obtaining a third frame transmitted by the other apparatus in response to the first frame, the third frame including information indicating a difference between a first time that the first frame was received by the other apparatus and a second time that the second frame was transmitted by the other apparatus and an indication of at least one of an orientation of departure of the second frame or an orientation of arrival of the first frame, and means for estimating a location of the apparatus relative to the other apparatus based, at least in part, on the difference between the first time and the second time and at least one of the orientation of departure of the second frame or the orientation of arrival of the first frame.

Certain aspects of the present disclosure provide a computer program product. The computer program product generally includes a computer readable medium having instructions stored thereon for outputting, by an apparatus, a first frame for transmission to another apparatus at a first time, obtaining, at a second time, a second frame transmitted by the other apparatus in response to the first frame, and generating a third frame for transmission to the other apparatus via the transmit interface, the third frame including information indicating a difference between the first time and the second time and an indication of at least one of an orientation of departure of the first frame or an orientation of arrival of the second frame.

Certain aspects of the present disclosure provide a computer program product. The computer program product generally includes a computer readable medium having instructions stored thereon for outputting, by an apparatus, a first frame for transmission to another apparatus in response to a second frame received from the other apparatus, obtaining a third frame transmitted by the other apparatus in response to the first frame, the third frame including information indicating a difference between a first time that the first frame was received by the other apparatus and a second time that the second frame was transmitted by the other apparatus and an indication of at least one of an orientation of departure of the second frame or an orientation of arrival of the first frame, and estimating a location of the apparatus relative to the other apparatus based, at least in part, on the difference between the first time and the second time and at least one of the orientation of departure of the second frame or the orientation of arrival of the first frame.

Certain aspects of the present disclosure provide a wireless station. The wireless station generally includes at least one antenna, a transmitter configured to transmit, via the at least one antenna, a first frame to another wireless station at a first time, a receiver configured to receive via the at least one antenna, at a second time, a second frame transmitted by the other wireless station in response to the first frame, and a processing system configured to generate a third frame for transmission to the other wireless station via the transmit interface, the third frame including information indicating a difference between the first time and the second time and an indication of at least one of an orientation of departure of the first frame or an orientation of arrival of the second frame.

Certain aspects of the present disclosure provide a wireless station. The wireless station generally includes at least one antenna, a transmitter configured to transmit, via the at least one antenna, a first frame to another wireless station in response to a second frame received from the other wireless station, a receiver configured to receive, via the at least one antenna, a third frame transmitted by the other wireless station in response to the first frame, the third frame including information indicating a difference between a first time that the first frame was received by the other wireless station and a second time that the second frame was transmitted by the other wireless station and an indication of at least one of an orientation of departure of the second frame or an orientation of arrival of the first frame, and a processing system configured to estimate a location of the wireless station relative to the other wireless station based, at least in part, on the difference between the first time and the second time and at least one of the orientation of departure of the second frame or the orientation of arrival of the first frame.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
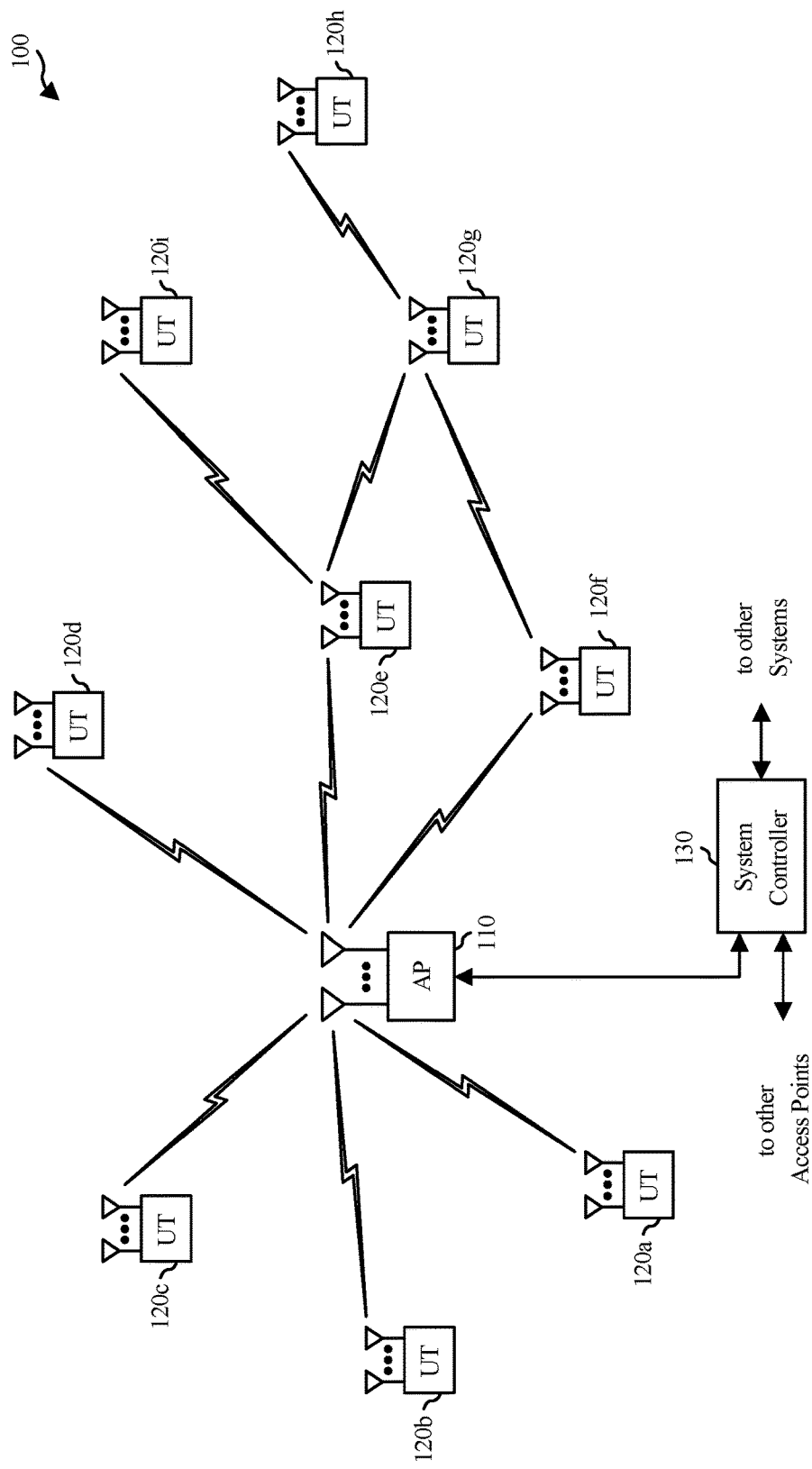
FIG. 1 illustrates an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to location reporting for extremely high frequency (EFH) device. As will be described in more detail herein, fine timing measurements (FTM) regarding distance between two stations may be included with relative orientation (e.g., direction) information, such as angle of arrival (AoA) and/or angle of departure (AoD) in a beam training phase and/or a beam refining phase. For example, a responding station may output a first frame for transmission to the initiating station at a first time. The responding station may obtain, at a second time, a second frame from the initiating station in response to the first frame. The responding station may generate a third frame for transmission to the initiating station that includes information indicating a difference between the first and the second time and also including an AoD of the first frame and/or an AoA of the second frame. The initiating station may use the difference between the first time and the second time and the AoA and/or AoD to estimate a location of the initiating station relative to the responding station.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA" such as an "AP STA" acting as an AP or a "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, at a first time, any of the wireless stations such as the access point 110 or the user terminals 120 may send another of the wireless stations which may be access point 110 or user terminal 120. At a second time, the wireless station may receive a second frame from the other wireless station in response to the first frame. The wireless station may transmit a third frame to the other wireless station that includes information indicating a difference between the first and the second time and also including relative orientation information, such as an angle of departure (AoD) of the first frame and/or an angle of arrival (AoA) of the second frame. The other wireless station may use the difference between the first time and the second time and the AoA and/or AoD to estimate a location of the other wireless station relative to the wireless station.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal (also referred to as a station or STA) may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
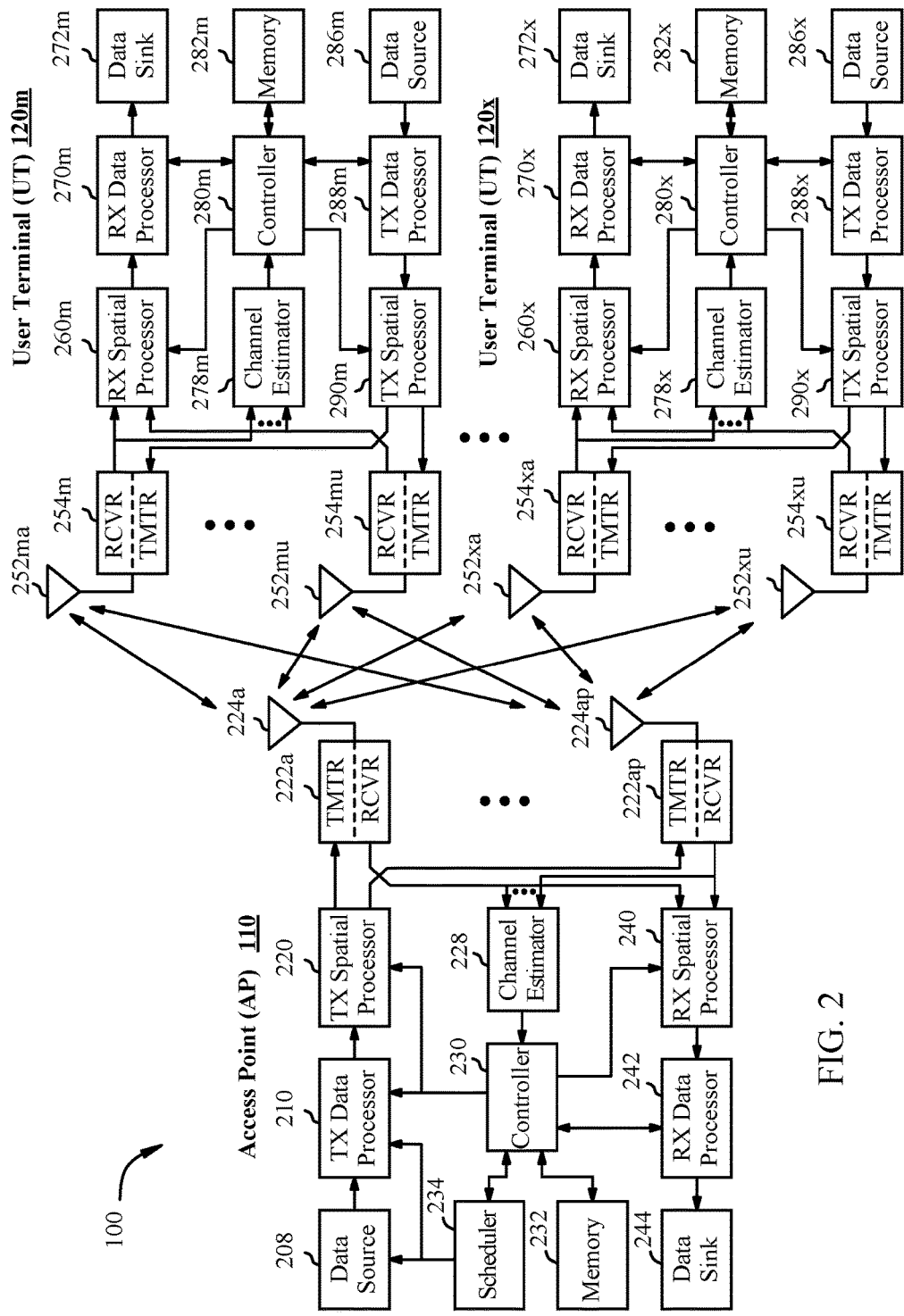
FIG. 2 is a block diagram of an example access point (AP) and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 or antenna 252, Tx/Rx 254, processors 260, 270, 288, and 290, and/or controller 280 may be used to perform the operations described herein and illustrated with reference to FIGS. 8 and 8A and/or FIGS. 9 and 9A.

FIG. 2 illustrates a block diagram of access point 110 two user terminals 120m and 120x in a MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink.

As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
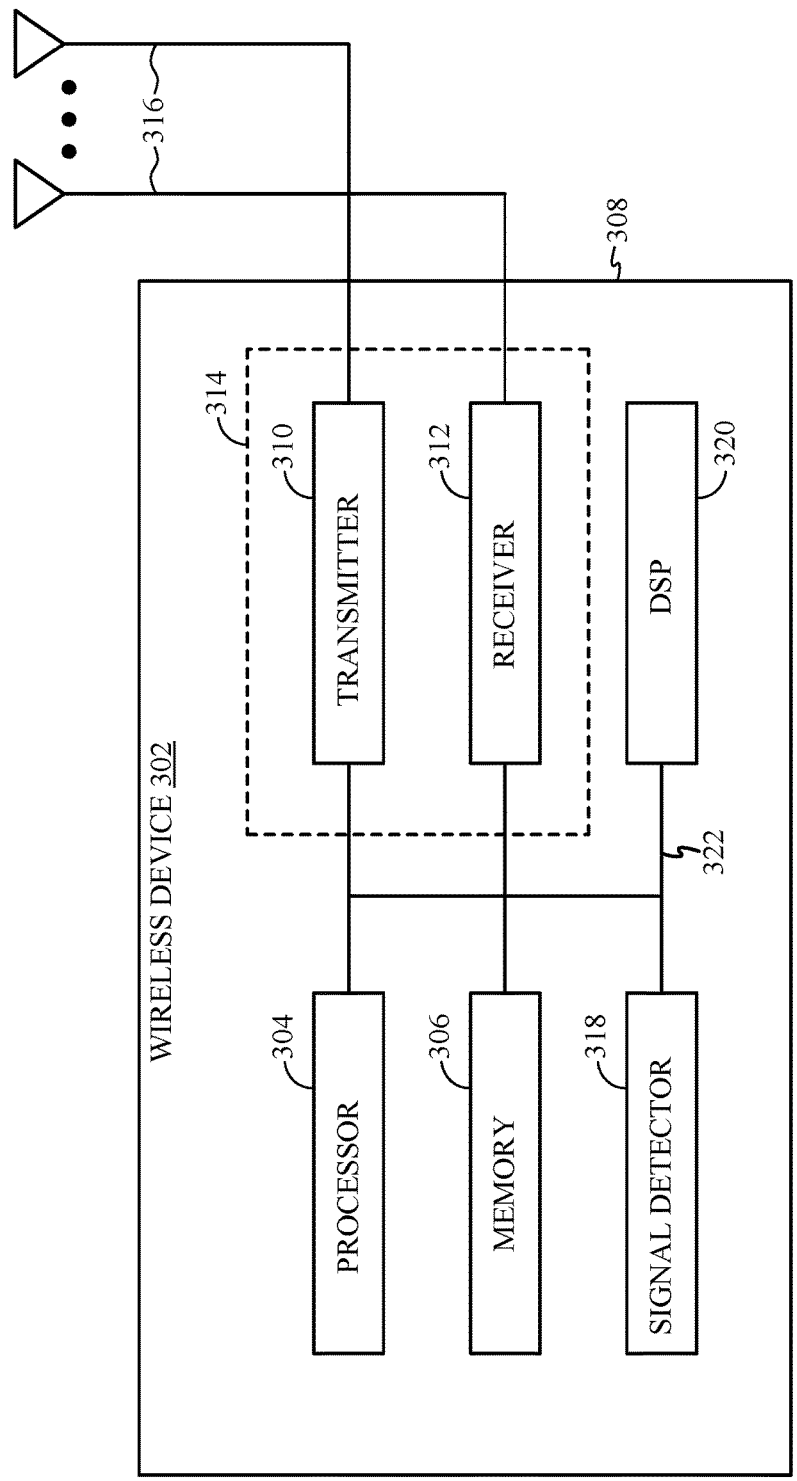
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 800 and 900 illustrated in FIGS. 8 and 9, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Beamforming Training

Aspects of the present disclosure may be used to determine relative rotation of devices (e.g., APs and/or non-AP STAs) based on training signals. In some cases, the training signals may be transmitted as part of a beamforming (BF) training process according to, for example, the IEEE 802.11ad standard. Knowing the relative rotation may allow each device to optimize antenna settings for transmit and reception.

Figure 4:
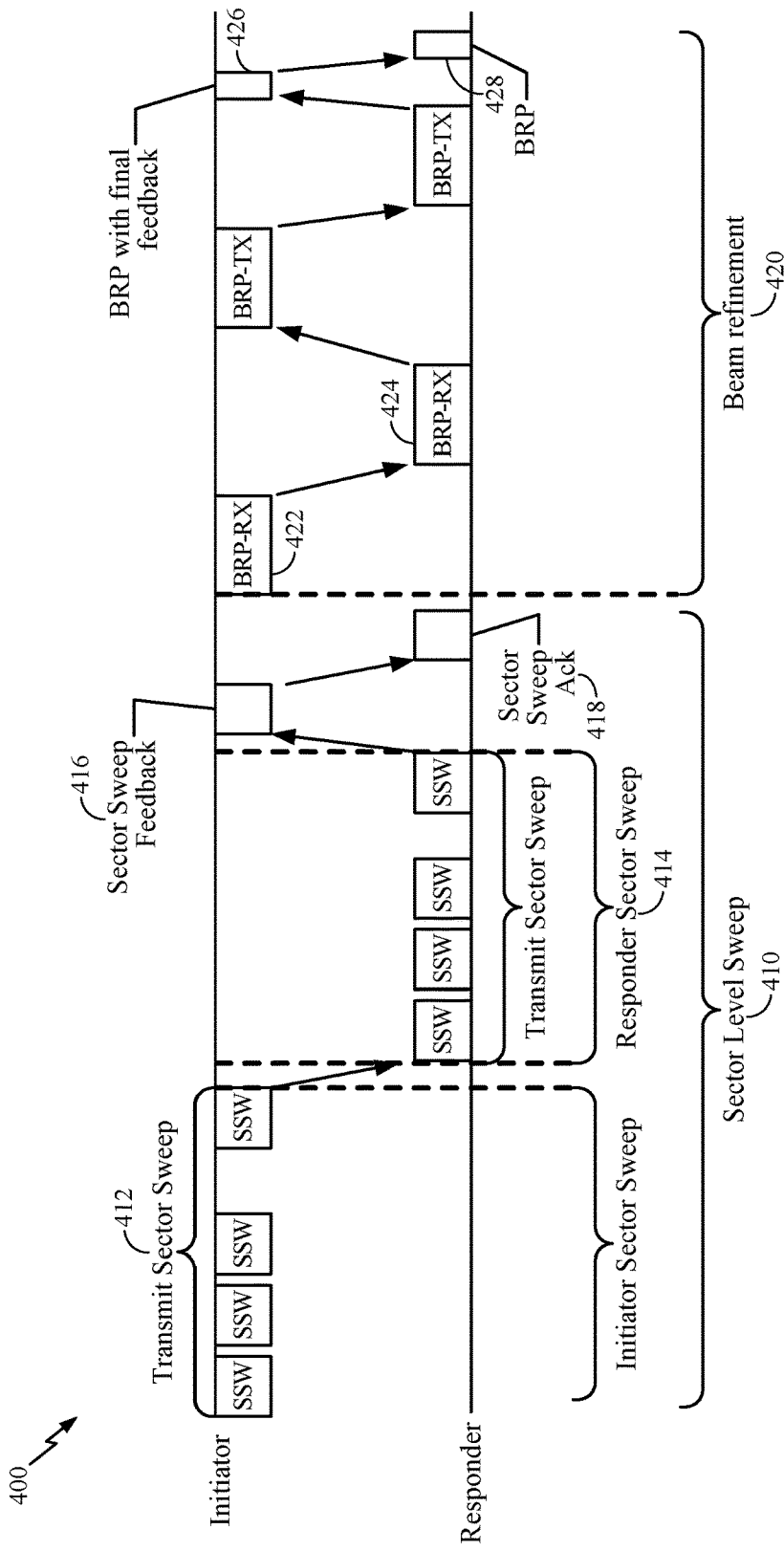
FIG. 4 is an example call flow illustrating a beam training phase, in accordance with certain aspects of the present disclosure.

An example BF training process is illustrated in FIG. 4. The BF process is typically employed by a pair of millimeter-wave stations, e.g., a receiver and transmitter. Each pairing of the stations achieves the necessary link budget for subsequent communication among those network devices. As such, BF training typically involves a bidirectional sequence of BF training frame transmissions that uses sector sweep and provides the necessary signals to allow each station to determine appropriate antenna system settings for both transmission and reception. After the successful completion of BF training, a (e.g., millimeter-wave) communication link may be established.

The beamforming process can help address one of the problems for communication at the millimeter-wave spectrum, which is its high path loss. As such, a large number of antennas are place at each transceiver to exploit the beamforming gain for extending communication range. That is, the same signal is sent from each antenna in an array, but at slightly different times.

As shown in the example BF training process 400 illustrated in FIG. 4, the BF process may include a sector level sweep (SLS) phase 410 and a subsequent beam refinement stage 420. In the SLS phase, one of the STAs acts as an initiator by conducting an initiator sector sweep 412, which is followed by a transmit sector sweep 414 by the responding station (where the responding station conducts a responder sector sweep). A sector generally refers to either a transmit antenna pattern or a receive antenna pattern corresponding to a particular sector ID. As mentioned above, a station may have a transceiver that includes one or more active antennas in an antenna array (e.g., a phased antenna array).

The SLS phase 410 typically concludes after an initiating station receives sector sweep feedback 416 and sends a sector acknowledgement (ACK) 418, thereby establishing BF. Each transceiver of the initiator station and of the responding station is configured for conducting a receiver sector sweep (RXSS) reception of sector sweep (SSW) frames via different sectors, in which a sweep is performed between consecutive receptions and a transmission of multiple sector sweeps (SSW) (TXSS) or directional Multi-gigabit (DMG) beacon frames via different sectors, in which a sweep is performed between consecutive transmissions.

During the beam refinement phase 420, each station can sweep a sequence of transmissions (422 and 424), separated by a short beamforming interframe space (SBIFS) interval, in which the antenna configuration at the transmitter or receiver can be changed between transmissions, culminating in the exchange of final BRP feedback 426 and 428. In this manner, beam refinement is a process where a station can improve its antenna configuration (or antenna weight vector) both for transmission and reception. That is, each antenna includes an antenna weight vector (AWV), which further includes a vector of weights describing the excitation (amplitude and phase) for each element of an antenna array.

Figure 5:
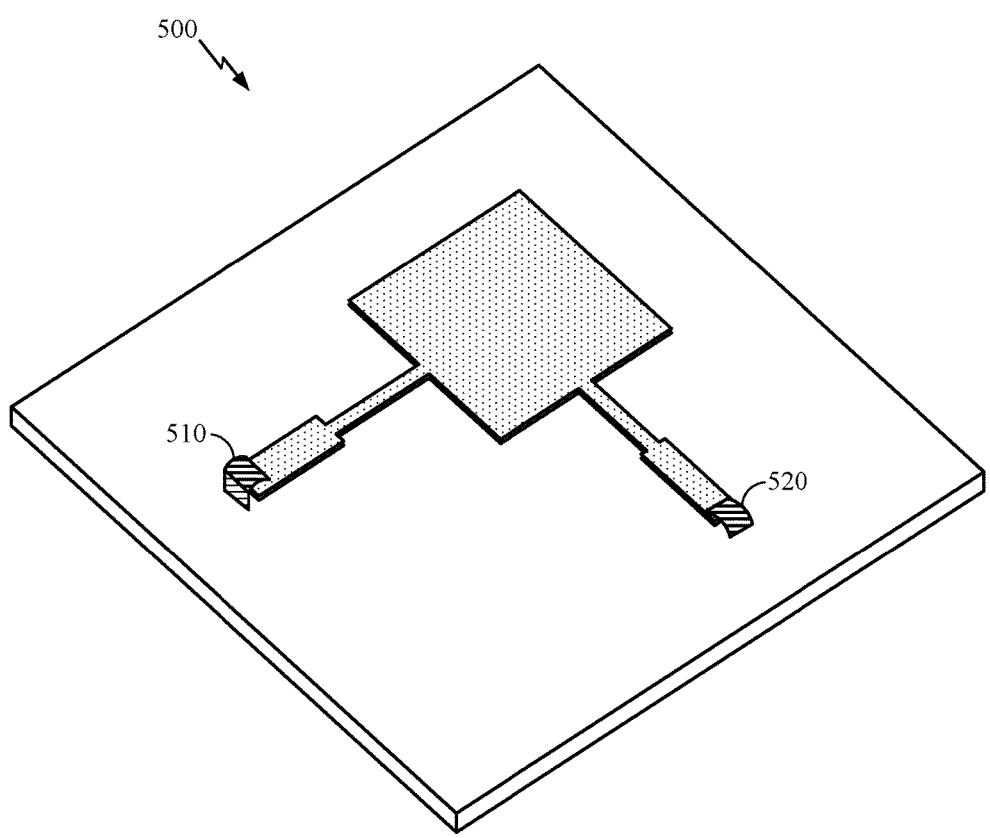
FIG. 5 illustrates an example dual polarized patch element, in accordance with certain aspects of the present disclosure.

FIG. 5 illustrates an example dual polarized patch element 500 which may be employed, in accordance with certain aspects of the present disclosure. As shown in FIG. 5, a single element of an antenna array may contain multiple polarized antennas. Multiple elements may be combined together to form an antenna array. The polarized antennas may be radially spaced. For example, as shown in FIG. 5, two polarized antennas may be arranged perpendicularly, corresponding to a horizontally polarized antenna 510 and a vertically polarized antenna 520. Alternatively, any number of polarized antennas may be used. Alternatively or in addition, one or both antennas of an element may also be circularly polarized.

Figure 6:
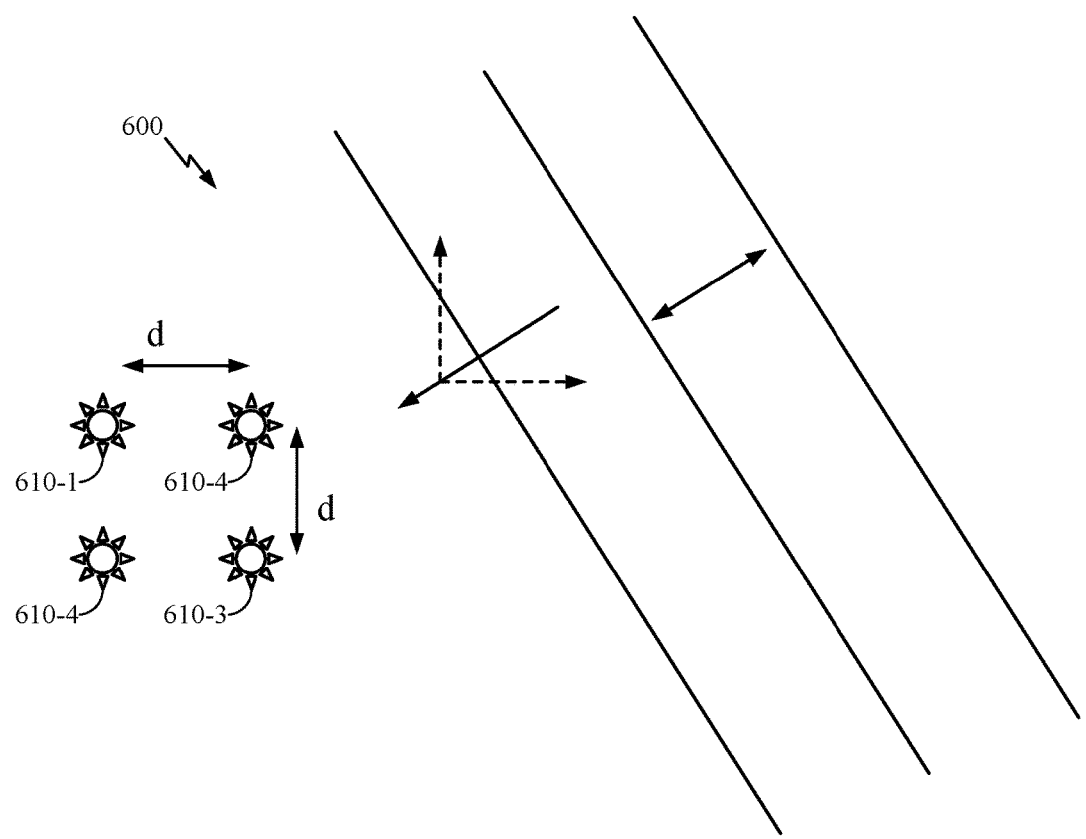
FIG. 6 is a diagram illustrating signal propagation in an implementation of phased-array antennas, in accordance with certain aspects of the present disclosure.

FIG. 6 is a diagram illustrating signal propagation 600 in an implementation of phased-array antennas. Phased array antennas use identical elements 610-1 through 610-4 (hereinafter referred to individually as an element 610 or collectively as elements 610). The direction in which the signal is propagated yields approximately identical gain for each element 610, while the phases of the elements 610 are different. Signals received by the elements are combined into a coherent beam with the correct gain in the desired direction. An additional consideration of the antenna design is the expected direction of the electrical field. In case the transmitter and/or receiver are rotated with respect to each other, the electrical field is also rotated in addition to the change in direction. This requires that a phased array be able to handle rotation of the electrical field by using antennas or antenna feeds that match a certain polarity and capable of adapting to other polarity or combined polarity in the event of polarity changes.

Information about signal polarity can be used to determine aspects of the transmitter of the signals. The power of a signal may be measured by different antennas that are polarized in different directions. The antennas may be arranged such that the antennas are polarized in orthogonal directions. For example, a first antenna may be arranged perpendicular to a second antenna where the first antenna represents a horizontal axis and the second antenna represents a vertical axis such that the first antenna is horizontally polarized and the second vertically polarized. Additional antennas may also be included, spaced at various angles in relation to each other. Once the receiver determines the polarity of the transmission the receiver may optimize performance by using the reception by matching the antenna to the received signal.

Example Location Reporting for Extremely High Frequency (EHF) Devices

Certain aspects of the present disclosure provide for including fine timing measurements (FTM) with angle of arrival (AoA) and angle of departure (AoD) information in a beamforming training protocol (BTP) for extremely high frequency (EHF) devices such as mmWave devices.

In certain systems, such as IEEE 802.11mc systems, FTM messages are used to measure the distance between two wireless stations, for example, based on round trip travel time (RTT) of messages transmitted between an initiating STA and a responding STA. According to certain aspects, "wireless station" may refer to either an access point (AP) or a non-AP mobile device. The two wireless stations may be referred to as an Initiating STA and a Responding STA.

According to aspects of the present disclosure, the FTM messages may also be used to report direction information, such as AoA and AoD. By using the report for direction, a single flow may be used for location estimation and tracking of movement may be easier since the direction measurements are coupled to time measurements.

As presented herein, messages used for FTM and acknowledgments (ACK) may also be used for reporting AoA and AoD. However, in certain (e.g., mmWave) devices, the AoA and AoD measurements may be performed during the beam-training phase and/or the beam refinements phase, which are not part of the typical FTM protocol.

Figure 7:
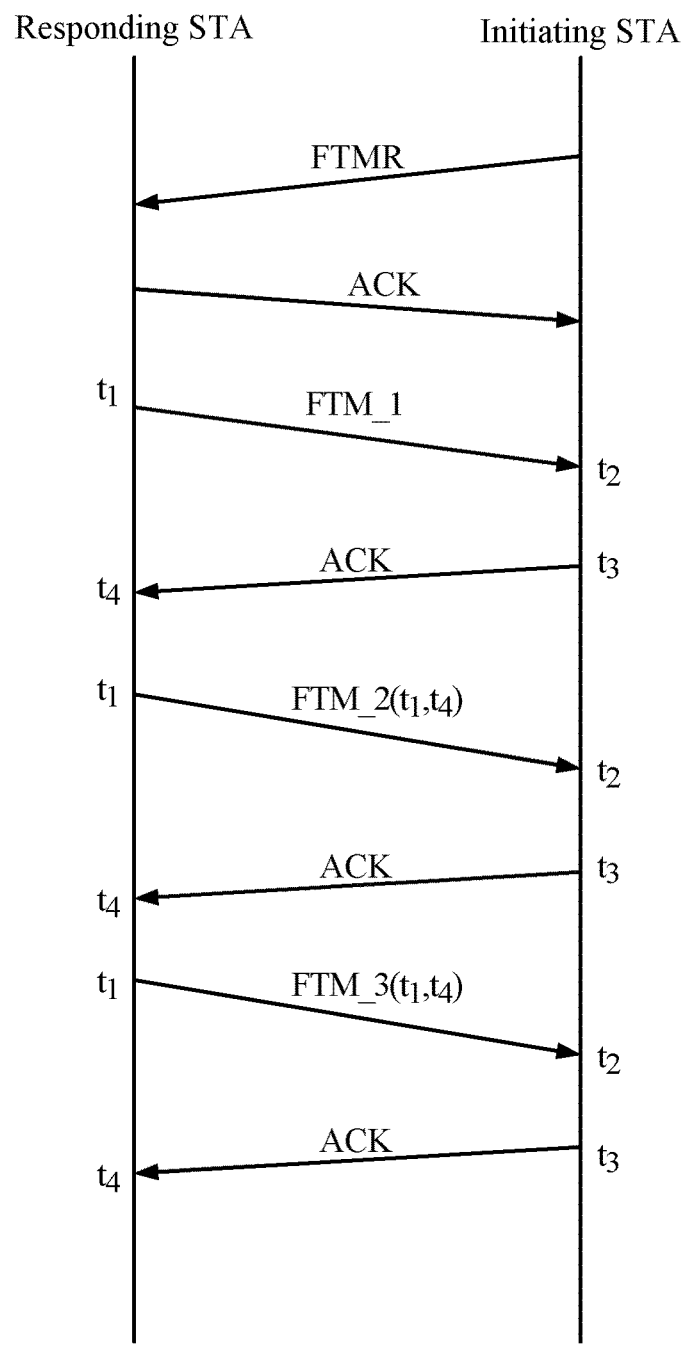
FIG. 7 is an example call flow illustrating a fine timing measurement (FTM) procedure.

FIG. 7 is an example call flow 700 illustrating a frame exchange for an FTM procedure. As shown in FIG. 7, the Initiating STA may send an FTM Request (FTMR) frame to the Responding STA to start the FTM procedure. The Responding STA may send an ACK to the Initiating STA.

After the FTMR and ACK, the Responding STA may start sending FTM frames (with the transmission times for the FTM frames indicated as $t_1$) which may be received by the Initiating STA at a time indicated as $t_2$. At $t_3$ the Initiating STA may respond with an ACK which may be received by the Responding STA at $t_4$. This may be repeated for each FTM frame (FTM_1, FTM_2, FTM_3) transmitted by the Responding STA.

The current FTM frame may have an indication of the $t_1$ and the $t_4$ values from the previous FTM/ACK frame exchange embedded therein. The Initiating STA may then use $t_1$, $t_2$, $t_3$, and $t_4$ (since it already knows $t_2$ and $t_3$, having received an FTM at $t_2$ and having sent an ACK at $t_3$) to estimate the RTT between the Responding STA and the Initiating STA.

The RTT may then be used to estimate the range (distance) between the two wireless stations. To determine its own location (e.g., in 2 dimensions), one wireless station may acquire RTT measurements from at least three other wireless stations that are at locations known to the wireless station. The wireless station may use the RTT measurements from these other wireless stations to compute its own 2D location (e.g., using triangulation algorithms).

Unfortunately, this may increase the number of exchanged FTM frames and reduce network throughput. Accordingly, aspects of the present disclosure provide techniques that may allow for estimating location of a wireless station by exchanging FTM frames with only one other wireless station.

For example, the techniques provided herein may allow for AoA estimation and embedding AoA and/or AoD information in FTM messages, which may allow a wireless station to exchange FTM frames with only one other wireless station to compute its (2D or 3D) location.

According to certain aspects, such FTM messages may be coupled to the beam refinement protocol (BRP) information element (IE). In this manner, when BRP is performed, where AoA and AoD may be measured, the distance measurement phase in the FTM may also be performed.

Figure 8:
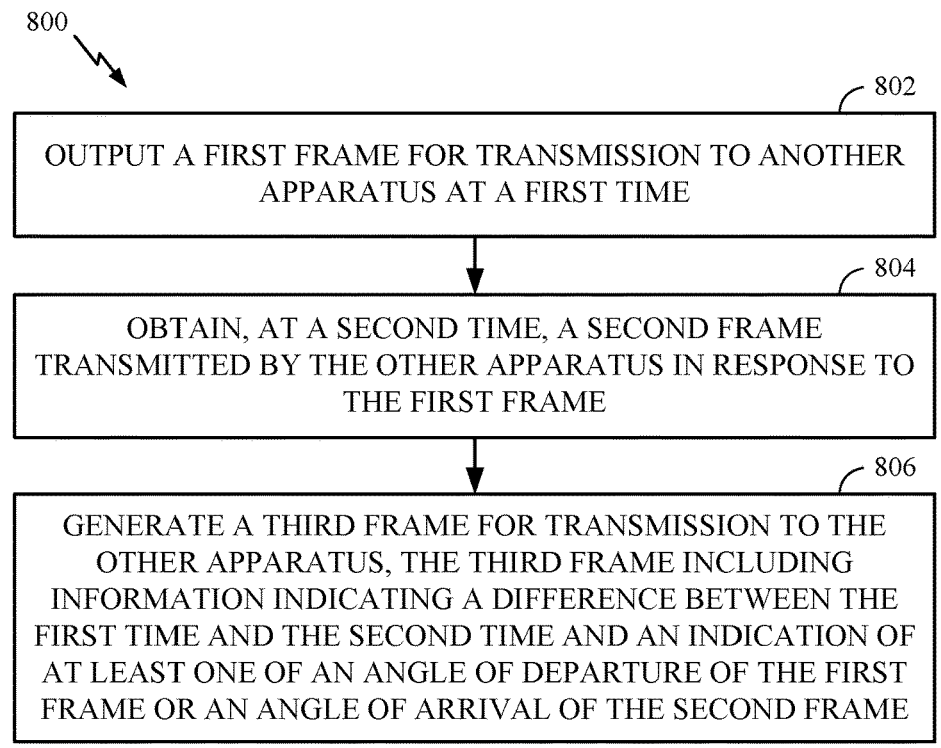
FIG. 8 is a flow diagram of example operations for wireless communications, in accordance with certain aspects of the present disclosure.
Figure 8A:
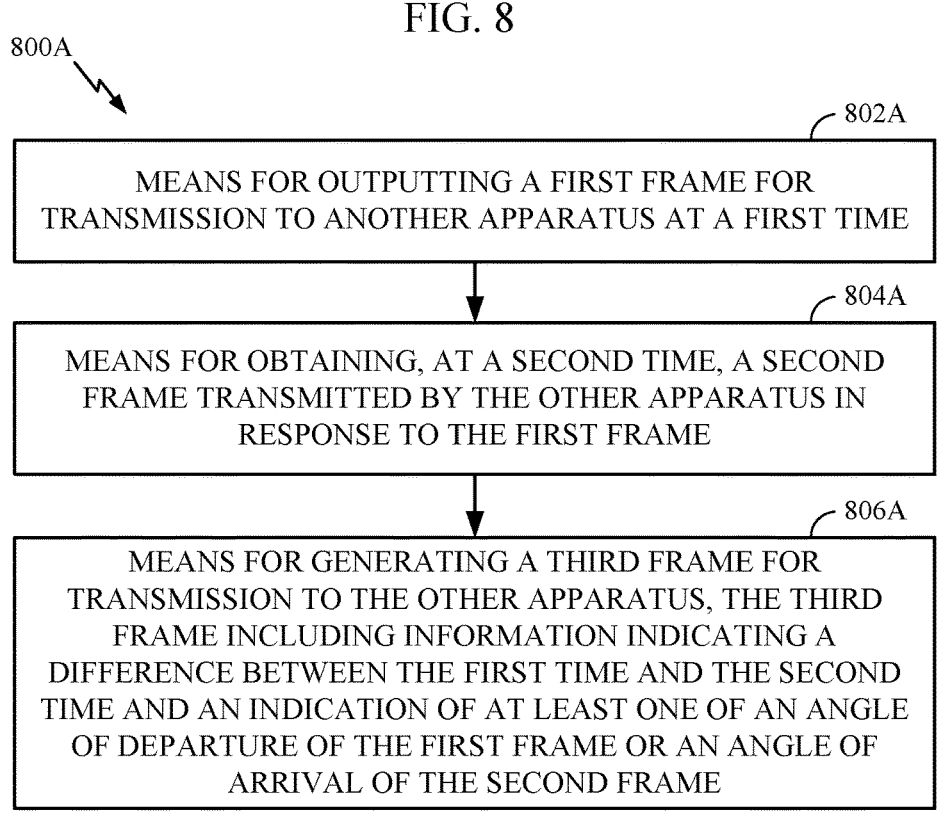
FIG. 8A illustrates example means capable of performing the operations shown in FIG. 8.

FIG. 8 is a flow diagram of example operations 800 for wireless communications, in accordance with certain aspects of the present disclosure. The operations 800 may be performed, for example, by a Responding STA such as that shown in FIG. 10 (e.g., AP 110 or UT 120 or any type of station).

The operations 800 begin, at 802, by outputting a first frame (e.g., FTM_1) for transmission to another apparatus (e.g., the Initiating STA) at a first time (e.g., $t_1$). According to certain aspects, the first frame may include an indication of an AoD for a frame previously transmitted by the Responding STA.

At 804, the Responding STA may obtain, at a second time (e.g., $t_4$), a second frame transmitted (e.g., at t3) by the other apparatus in response to the first frame (e.g., the ACK received at $t_2$). According to certain aspects, the second frame may be received via a plurality of receive antennas.

At 806, the Responding STA may generate a third frame (e.g., FTM_2) for transmission to the other apparatus via the transmit interface, the third frame including information indicating a difference between the first time and the second time (e.g., $t_4$-$t_1$) and an indication of at least one of an orientation of departure (e.g., AoD) of the first frame or an orientation of arrival (e.g., AoA) of the second frame.

The Responding Station may estimate AoA using any suitable mechanism. For example, the Responding STA may estimate the AoA of the second frame (e.g., the ACK) based on data regarding calibration of the receive antennas. The antenna calibration data may be obtained from any of the existing antenna calibration methods and, in some cases, the calibration may be done offline and saved for later use.

According to certain aspects, the Responding STA may selectively enable different combinations of the receive antennas while receiving the second frame and estimate the AoA of the second frame based on channel estimates calculated for the different combinations of receive antennas (allowed by enabling the different combinations). For example, the Responding STA may switch receive antennas to different periods during ACK reception and estimate the channel for each pattern. In the case that the Responding STA can only do long training field (LTF) processing, the Responding STA may perform AoA estimation based on N FTM frames and ACK frames for N antenna patterns.

According to certain aspects, the AoA and/or AoD may be expressed as a first angle (e.g., $\theta_{AoA}$) in a first plane (e.g., the (y,z) plane) and a second angle ($\varphi_{AoA}$) in a second plane (e.g., the (x,y) plane) perpendicular to the first plane. The AoA may contain both $\theta_{AoA}$ and $\varphi_{AoA}$. $\theta_{AoA}$ may be 12 bits representing 0-180° (e.g., with 0.044° resolution) and $\varphi_{AoA}$ may be 12 bits representing 0-360° (e.g., with 0.088° resolution). In some cases, the AoD may contain both $\theta_{AoD}$ and $\varphi_{AoD}$. Similarly, $\theta_{AoD}$ may be 12 bits representing 0-180° and $\varphi_{AoD}$ may be 12 bits representing 0-360°.

An FTM message according to a current FTM protocol provides 48 bits for time of departure (ToD) report (e.g., $t_1$) and 48 bits for time of arrival (ToA) report (e.g., $t_4$). According to certain aspects, the ToD report field may be used (e.g., re-purposed) to report $t_4$-$t_1$ (the difference in ToD and ToA, which may be enough for the initiating STA to compute RTT) and the ToA report field may be re-purposed to report AoA and AoD as (e.g., 12 bits each) $\theta_{AoA}$, $\varphi_{AoA}$, $\theta_{AoD}$, and $\varphi_{AoD}$, which fits in the available 48 bits. According to certain aspects, a bit may be set to indicate whether or not the ToD and ToA timestamps are continuous.

According to certain aspects, the Responding STA may determine, based on capability information provided by the other apparatus, that the other apparatus is capable of understanding AoA and/or AoD. According to certain aspects, the Responding STA may provide, for example, in the first frame and/or the third frame, an indication to the other apparatus that the third frame includes or will include the AoA and/or AoD value.

Figure 9:
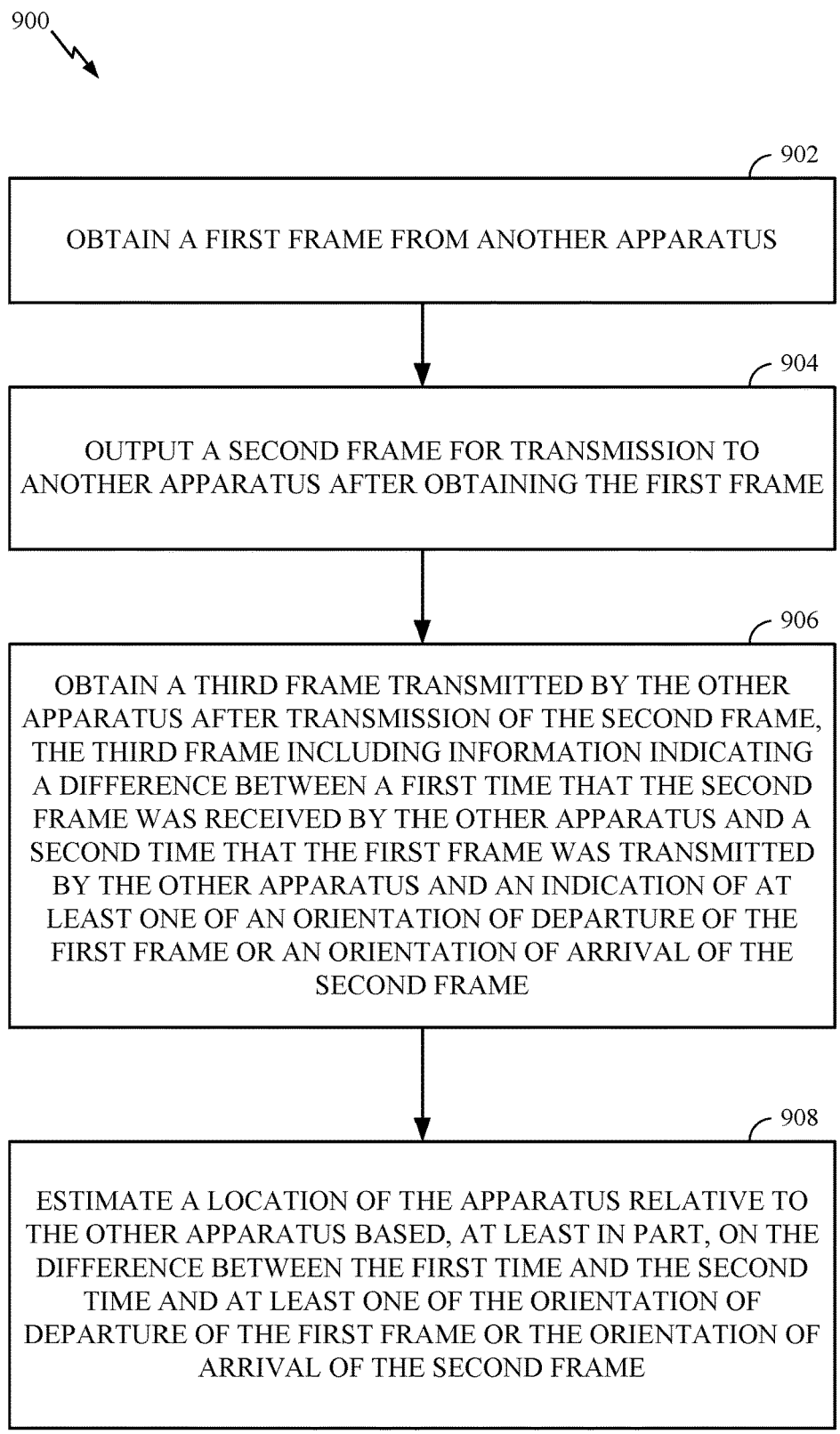
FIG. 9 is a flow diagram of example operations for wireless communications, in accordance with certain aspects of the present disclosure.
Figure 9A:
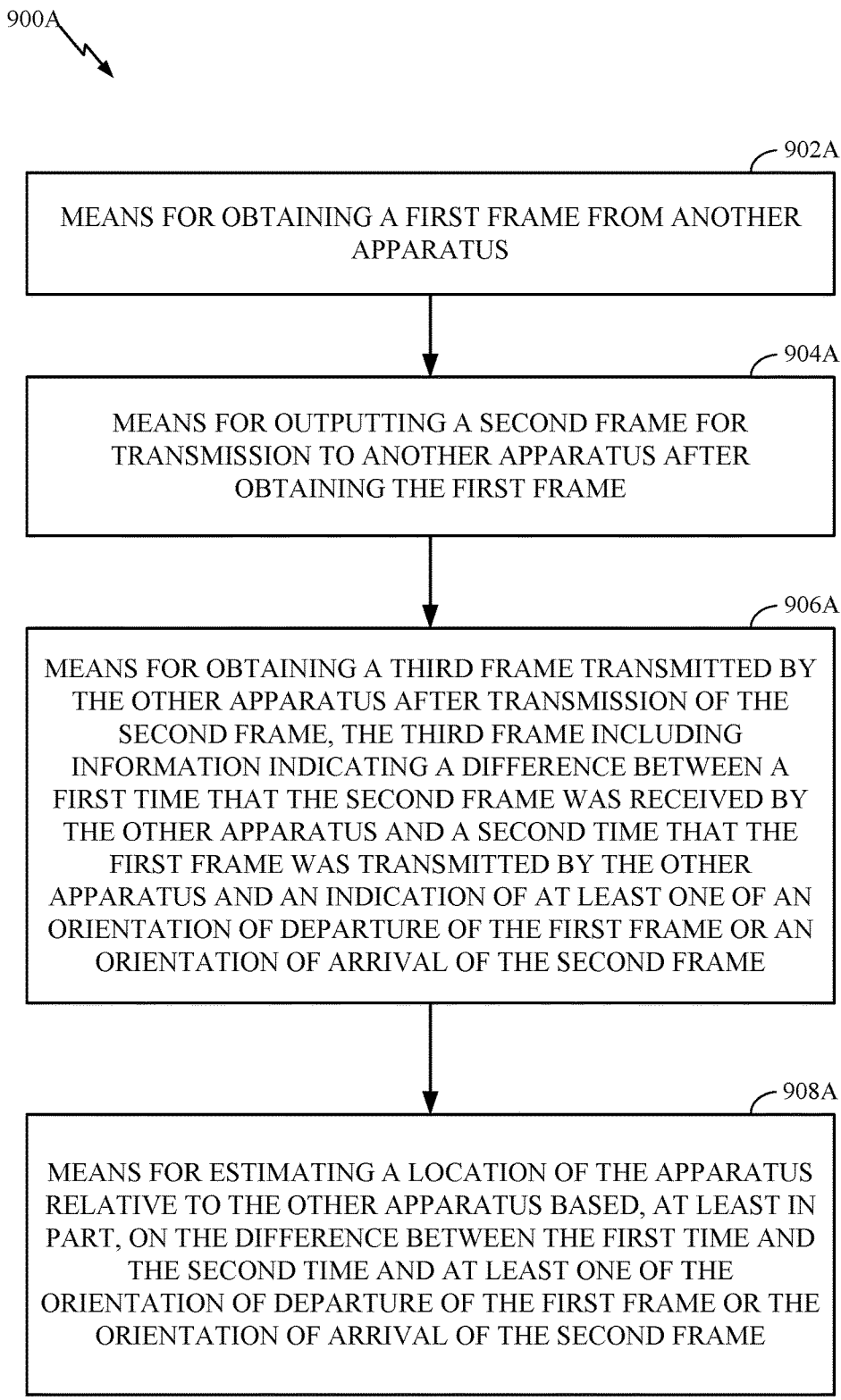
FIG. 9A illustrates example means capable of performing the operations shown in FIG. 9.

FIG. 9 is a flow diagram of example operations 900 for wireless communications, in accordance with certain aspects of the present disclosure. Operations 900 may be considered complementary to the operations 800 performed by the Responding STA illustrated in FIG. 8. In other words, the operations 900 may be performed, for example, by an Initiating STA shown in FIG. 10 (e.g., AP 110 or UT 120).

The operations 900 begin, at 902, by obtaining a first frame from another apparatus. At 904, the Initiating STA outputs (e.g., at $t_3$) a second frame (e.g., the ACK) for transmission to the other apparatus (e.g., the Responding STA) after obtaining the first frame (e.g., FTM_1) (e.g., at $t_2$). According to certain aspects, the second frame may include an indication of an orientation (e.g., AoD) for a frame previously transmitted by the other apparatus.

At 906, the Initiating STA may obtain a third frame (e.g., FTM_2_ transmitted by the other apparatus after receiving the second frame, the third frame including information indicating a difference between a first time that the second frame was received by the other apparatus and a second time that the first frame was transmitted by the other apparatus (e.g., t4-t1) and an indication of at least one of an orientation of departure (e.g., AoD) of the first frame or an orientation of arrival (e.g., AoA) of the second frame. As noted above, the indication of the AoA and/or the AoD may be expressed as a first angle (e.g., θ) in a first plane (e.g., the (y,z) plane) and a second angle (e.g., φ) in a second plane (e.g., the (x,y) plane) perpendicular to the first plane.

At 908, the Initiating STA may estimate a location of the Initiating STA relative to the other apparatus based, at least in part, on the difference between the first time and the second time and at least one of the orientation of departure of the first frame or the orientation of arrival of the second frame.

While angles of arrival and/or departure are provided as examples of directional parameters indicative of relative orientation between two devices, any other type of parameters indicative of orientation may also be used. Further, in general, such parameters indicative of orientation or direction may be reported relative to two or more axes and, further, may also be reported in other types of coordinate systems (e.g., other than x, y, and z coordinates), such as polar axes.

According to certain aspects, the Initiating STA may determine a RTT based on the difference between the first time and the second time, a time the second frame was received (e.g., $t_2$), and a time the first frame was transmitted (e.g., $t_3$). According to certain aspects, the Initiating STA may estimate an absolute (e.g., 3D) location of the other apparatus, based on the estimated location of the apparatus relative to the other apparatus and a known location of the apparatus. Similarly, the Initiating STA may estimate an absolute (e.g., 3D) location of the Initiating STA, for example, based on the estimated location of the Initiating STA relative to the other apparatus and a known location of the other apparatus.

According to certain aspects, the Initiating STA may provide, to the other apparatus, capability information indicating the Initiating Station is capable of understanding the indication of AoA and/or AoD. The capability information may be included, for example, as a dedicated bit in the Vendor Specific IE to indicate AoA/AoD capability. The Vendor Specific IE may part of the initial FTMR and FTM_1. Alternatively, reserved bits from the FTM IE may be used. For example, if the Initiating STA sets the AoA/AoD capability bit to 1 in the FTMR, this may indicate an ability to understand AOA/AOD information in FTM frames.

According to certain aspects, instead of having one bit to indicate AOA/AOD capability, two bits may separately indicate AOA and/or AOD capability.

In any case, the responding station may then generate the third frame based on the capability indicated by the initiating station. For example, the responding station may only include the AOA/AOD information if the initiating station indicates it is capable of understanding that information. Otherwise, the responding station may use a conventional reporting format. In some cases, the responding station may provide an indication (e.g., in the second or third frame) that it is including AOA/AOD information in the third frame, allowing the initiating station to know how to process the information in the third frame.

In such cases, the Initiating STA may determine, based on an indication provided in at least one of the second frame or the third frame, that the third frame includes or will include the indication of AoA and/or AoD. For example, when the Responding STA sees the AoA/AoD capability bit set to 1 from the Initiating STA, the Responding STA may decide to set the AoA/AoD capability bit to 1 in FTM_1 to indicate AOA/AOD is (or will be) embedded in FTM frames. Alternatively, to reduce air time, the Responding STA may not send the Vendor Specific IE, and the absence of the Vendor Specific IE transmission may indicate AOA/AOD will not be embedded in FTM frames.

Figure 10:
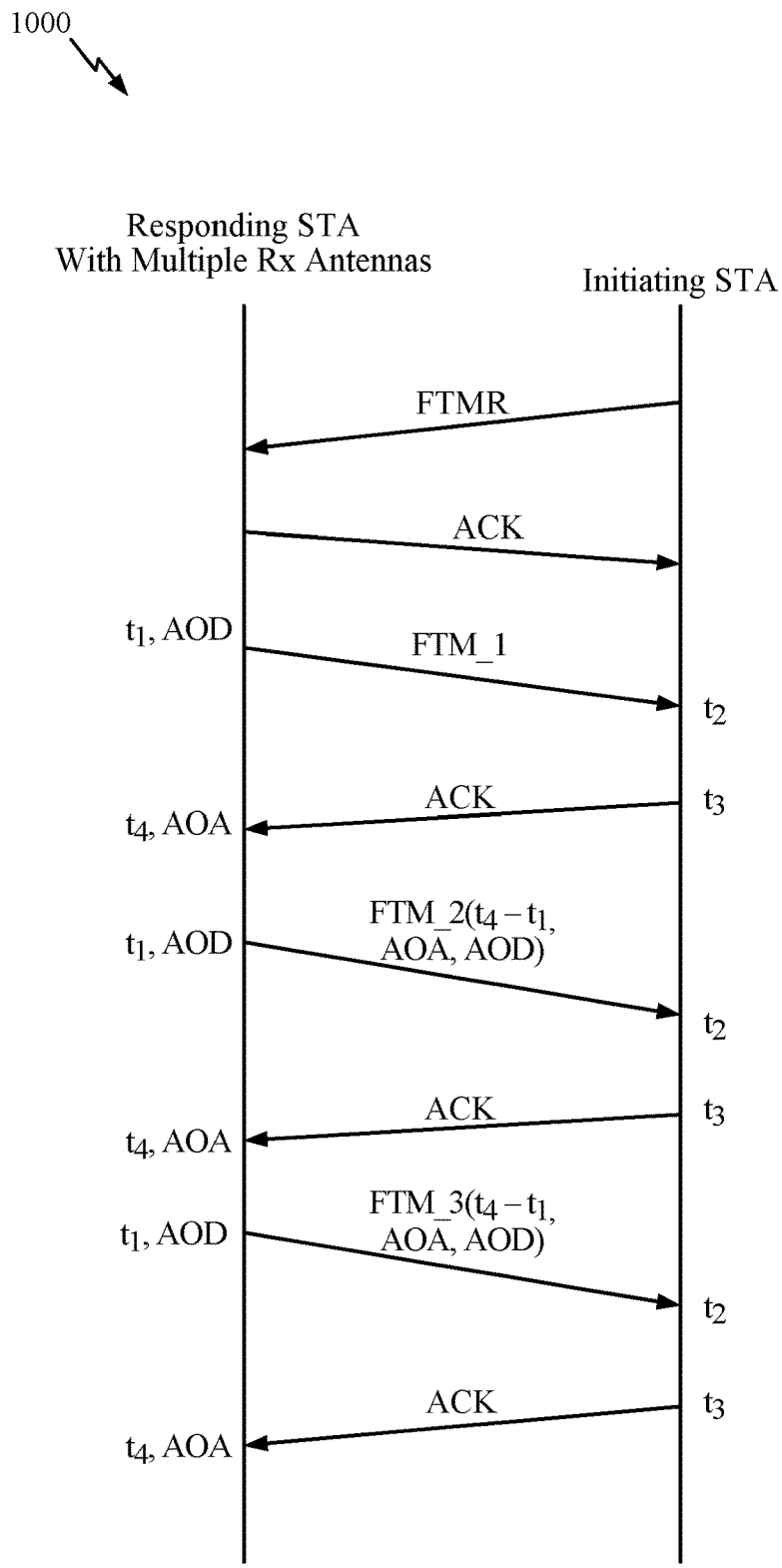
FIG. 10 is an example call flow illustrating a FTM procedure, in accordance with certain aspects of the present disclosure.

FIG. 10 is an example call flow 1000 of the FTM protocol corresponding to the operations 800 and 900 performed by the Responding STA and Initiating STA in FIGS. 8 and 9, respectively. As illustrated, the message exchange may be similar to that shown in FIG. 7, but the responding station may include, with an FTM message (e.g., FTM_2 in the illustrated example) an indication of a difference between t4 and t1 (since this is all the external information the Initiating Station needs to calculate RTT) as well as an indication of AOA (of the previous ACK) and/or AOD (or a previous FTM message).

As noted above, in some cases, ToD and ToA fields of an existing FTM message format may be re-purposed to covey the difference between t4 and t1 (e.g., using the bits of the ToD field) and AOA and AOD (e.g., using the bits of the ToA field). Using an alternative format, however, ToD and ToA fields may be used to convey t1 and t4 separately and separate fields may be used to convey AOA and/or AOD.

Figure 11:
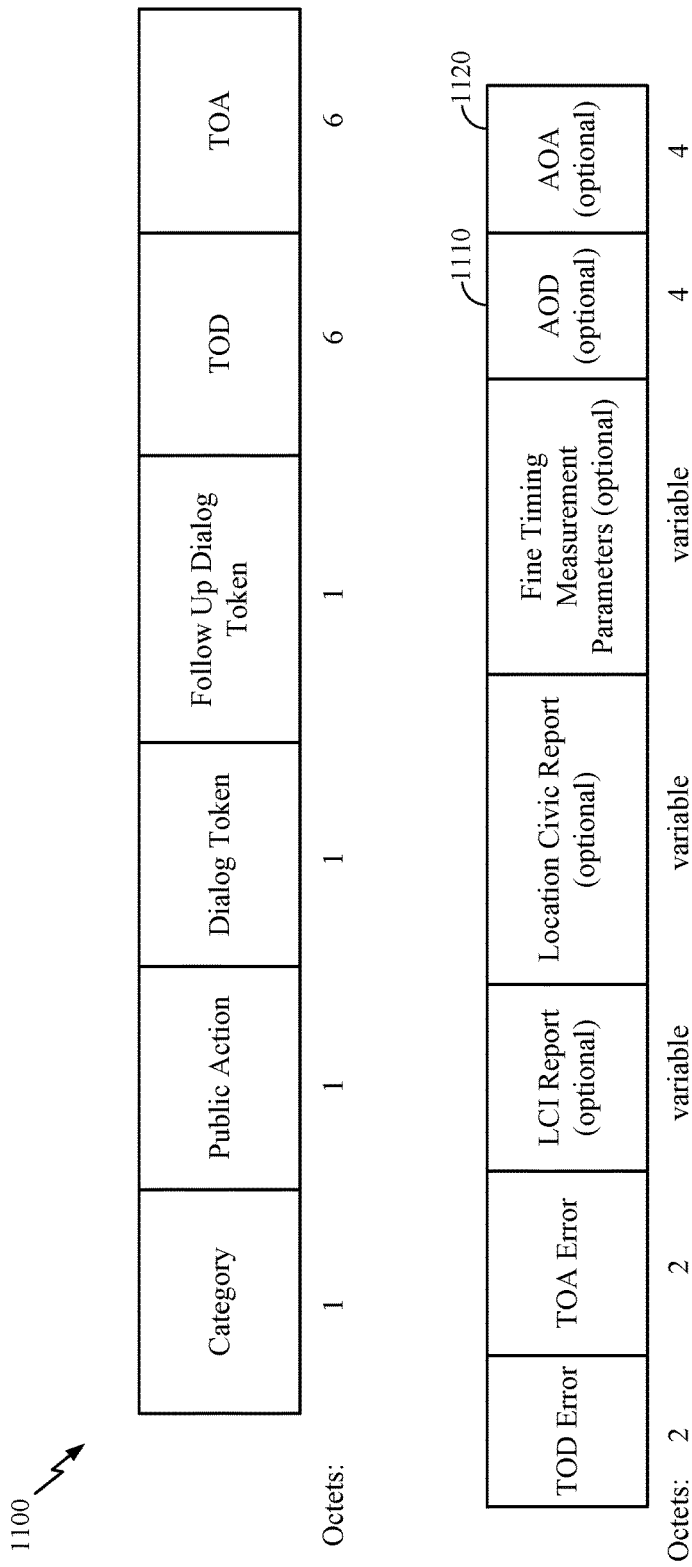
FIG. 11 illustrates an example FTM frame format, in accordance with certain aspects of the present disclosure.

For example, FIG. 11 illustrates such an alternative format 1100, in accordance with certain aspects of the present disclosure. As shown in FIG. 11, the FTM field includes, among other fields, a TOD field, a TOA field, a TOD Error field, a TOA Error field, and an optional FTM parameters field. As shown the format may also include an optional AOD field 1110, and an optional AOA field 1120. As shown in FIG. 11, in some cases, the AOA field 1110 and AOD field 1120 may each be 4 bytes in length to allow for an Element ID field plus a Length field. According to certain aspects, AOD for a previous exchange can be embedded in the FTM frame if available.

Figure 12:
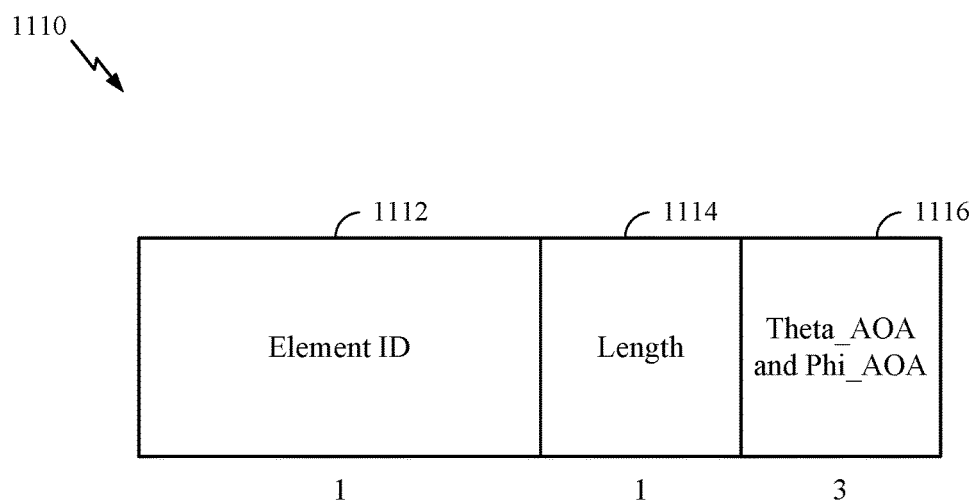
FIG. 12 illustrates an example AOA field format, in accordance with certain aspects of the present disclosure.
Figure 13:
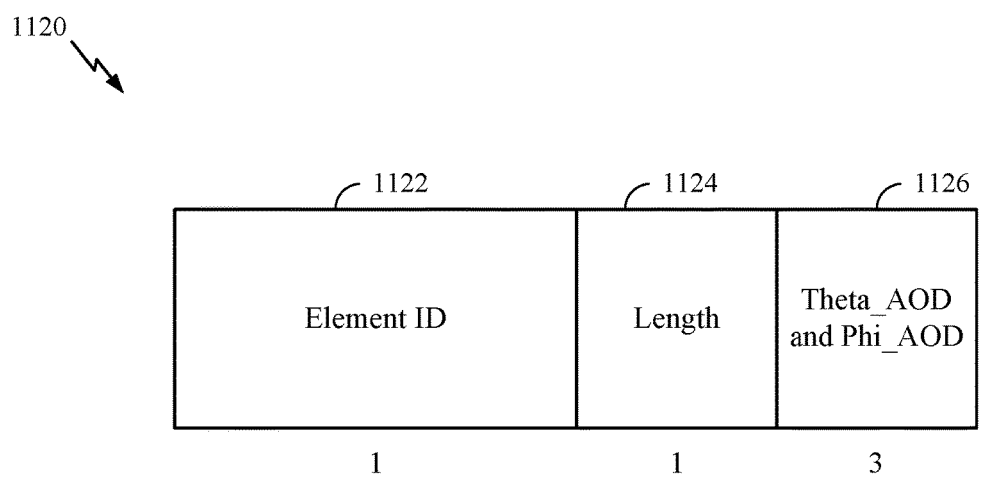
FIG. 13 illustrates an example AOD field format, in accordance with certain aspects of the present disclosure.

FIGS. 12-13 illustrate example formats for the AOA field 1110 and AOD field 1120, respectively, in accordance with certain aspects of the present disclosure. As shown in FIG. 12, the AOA field 1110 may have 5 bytes to accommodate an Element ID and Length field. For the AOA field 1110, the Element ID field 1112 may be set to the value to indicate an AOA element and the Length field 1114 may be set to 3. The Theta_AOA and Phi_AOA values, as described above, may be carried in a 3-byte field 1116. Similarly, as shown in FIG. 13, for the AOD field 1120, the Element ID field 1122 may be set to the value to indicate an AOD element, the Length field 1124 may set to 3, and the Theta_AOD and Phi_AOD values, as described above, may be carried in a 3-byte field 1126.

Figure 14:
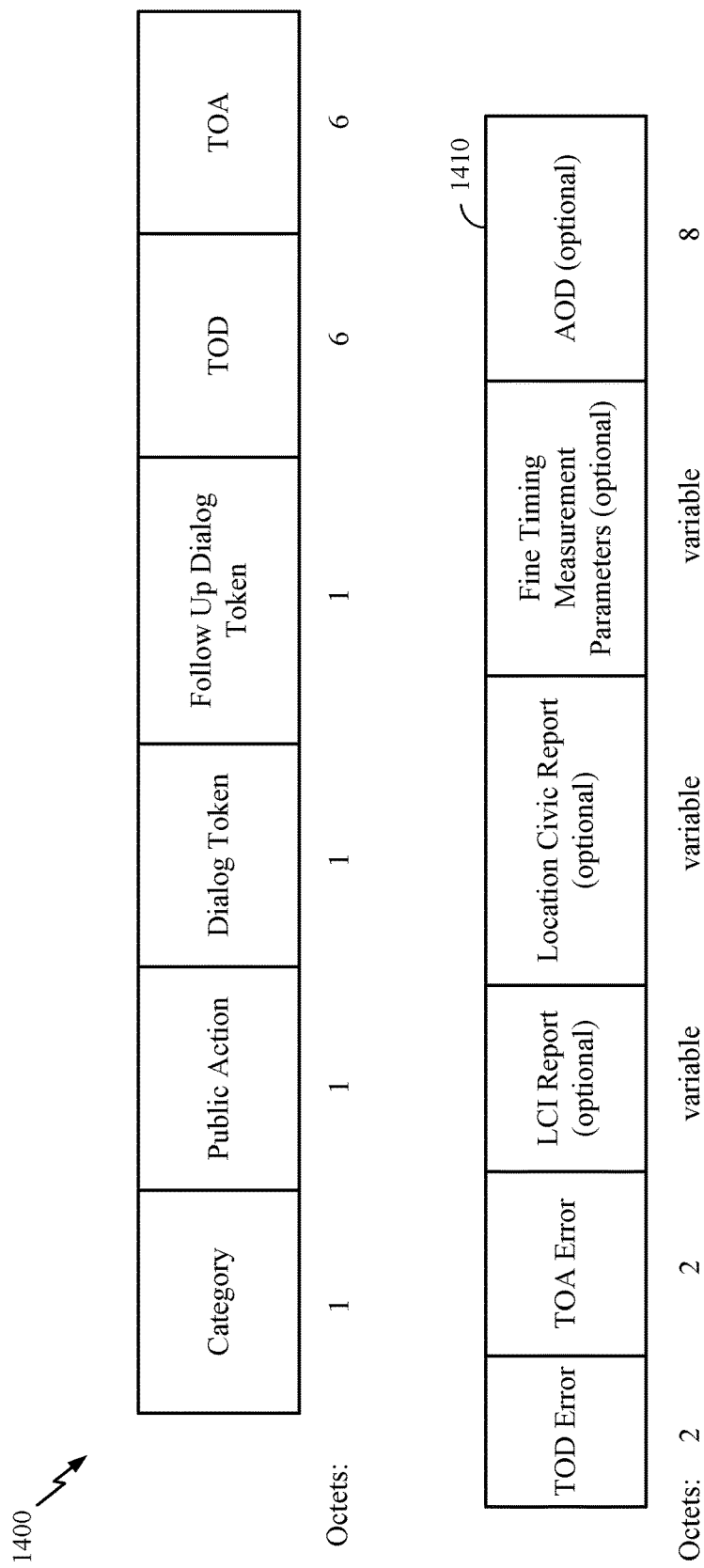
FIG. 14 illustrates an example FTM frame format, in accordance with certain aspects of the present disclosure.

FIG. 14 illustrates an example FTM frame format 1400, in accordance with certain aspects of the present disclosure. As shown in FIG. 14, rather than having separate (4 byte) AOA and AOD fields, the frame format 1400 may include a single optional (e.g., 8 byte AOD field 1410 that carries one or both of the AOA and AOD values.

Figure 15:
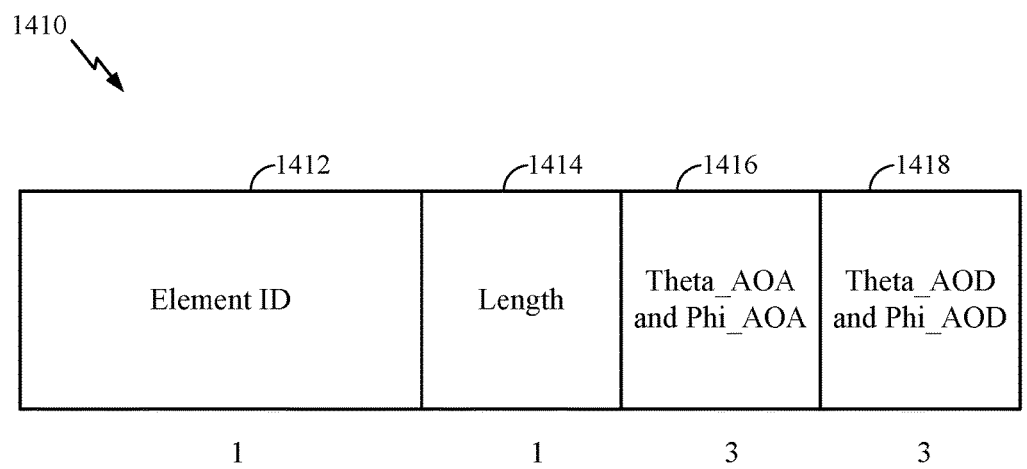
FIG. 15 illustrates an example AOA and AOD field format, in accordance with certain aspects of the present disclosure.

FIG. 15 illustrates an example format of the AOD field 1410, in accordance with certain aspects of the present disclosure. As shown in FIG. 15, the AOD field 1410 may have 8 bytes since it contains an Element ID field 1412 plus a Length field 1414. The Element ID field 1412 may be set to a value to indicate a single (joint) AOD element and the Length field 1414 may be set to 6 to indicate two 3-byte fields 1416 and 1418. The Theta_AOA and Phi_AOA values, as described above, may be carried field 1416, while the Theta_AOD and Phi_AOD values, as described above, may be carried in the field 1418.

According to certain aspects described herein, coupling FTM messages with AoD and AoA in BRP procedures may allow a wireless STA (e.g., a mmWave device) to estimate its location by exchanging FTM frames with only one other wireless STA, which may help conserve air resources and increase network throughput. Additionally, location-distance reports may be automatically updated whenever the geometry between the wireless STAs is changed (e.g., based on movement of one or both of the STAs).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 800 illustrated in FIG. 8 and operations 900 illustrated in FIG. 9 correspond to means 800A illustrated in FIG. 8A and means 900A illustrated in FIG. 9A, respectively.

For example, means for receiving and means for obtaining may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for transmitting and means for outputting may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Means for estimating, means for generating, means for including, means for determining, and means for providing may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above for providing an immediate response indication in a PHY header. For example, an algorithm for outputting a first frame for transmission to another apparatus at a first time, an algorithm for obtaining, at a second time, a second frame transmitted by the other apparatus in response to the first frame, and an algorithm for generating a third frame for transmission to the other apparatus via the transmit interface, the third frame including information indicating a difference between the first time and the second time and an indication of at least one of an angle of departure of the first frame or an angle of arrival of the second frame. In another example, an algorithm for outputting a second frame for transmission to another apparatus in response to a first frame received from the other apparatus, an algorithm for obtaining a third frame transmitted by the other apparatus in response to the second frame, the third frame including information indicating a difference between the first time and the second time and an indication of at least one of an angle of departure of the first frame or an angle of arrival of the second frame, and an algorithm for estimating a location of the apparatus relative to the other apparatus based, at least in part, on the difference between the first time and the second time and at least one of the angle of departure of the first frame or the angle of arrival of the second frame.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for outputting a first frame for transmission to another apparatus at a first time, instructions for obtaining, at a second time, a second frame transmitted by the other apparatus in response to the first frame, and instructions for generating a third frame for transmission to the other apparatus via the transmit interface, the third frame including information indicating a difference between the first time and the second time and an indication of at least one of an angle of departure of the first frame or an angle of arrival of the second frame. In another example, instructions for outputting a second frame for transmission to another apparatus in response to a first frame received from the other apparatus, instructions for obtaining a third frame transmitted by the other apparatus in response to the second frame, the third frame including information indicating a difference between the first time and the second time and an indication of at least one of an angle of departure of the first frame or an angle of arrival of the second frame, and instructions for estimating a location of the apparatus relative to the other apparatus based, at least in part, on the difference between the first time and the second time and at least one of the angle of departure of the first frame or the angle of arrival of the second frame.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a transmit interface configured to output a first frame for transmission to an other apparatus during a beam refinement phase;
    a receive interface configured to obtain, at a second time, a second frame transmitted by the other apparatus during the beam refinement phase; and
    at least one processor coupled with a memory and configured to:
        generate a third frame, during the beam refinement phase, for transmission to the other apparatus via the transmit interface, the third frame including a beam refinement protocol (BRP) information element (IE) comprising information indicating a difference between the first time and the second time, and a first indication of an orientation of departure of the first frame, a second indication of an orientation of arrival of the second frame, or both; and
        provide, in the first frame or the third frame, a third indication to the other apparatus that the third frame includes the first indication, the second indication, or both.

2. The apparatus of claim 1, wherein the second indication of the orientation of arrival of the second frame is expressed as a first angle in a first plane and a second angle in a second plane.

3. The apparatus of claim 1, wherein the first indication of the orientation of departure of the first frame is expressed as a first angle in a first plane and a second angle in a second plane.

4. The apparatus of claim 1, wherein the third frame comprises both the first indication and the second indication.

5. The apparatus of claim 1, wherein the third frame comprises a value indicative of the difference between the first time and the second time.

6. The apparatus of claim 1, wherein:
    the second frame is obtained via a plurality of receive antennas; and
    the processing system is configured to estimate the orientation of arrival of the second frame based on data regarding calibration of the receive antennas.

7. The apparatus of claim 1, wherein:
    the second frame is obtained via a plurality of receive antennas; and
    the processing system is configured to selectively enable different combinations of the receive antennas while receiving the second frame and to estimate the orientation of arrival of the second frame based on channel estimates for the different combinations of receive antennas.

8. The apparatus of claim 1, wherein the first frame includes a fourth indication of an orientation of departure for a frame previously transmitted by the apparatus.

9. The apparatus of claim 1, wherein:
    the processing system is configured to generate the third frame, based on a capability of the other apparatus to understand the first indication the second indication, or both.

10. The Apparatus of claim 1, wherein the at least one processor coupled with the memory is further configured to perform a beam training phase.

11. An apparatus for wireless communications, comprising:
    a receive interface configured to obtain a first frame from another apparatus during a beam refinement phase;
    a transmit interface configured to output a second frame for transmission to the other apparatus during the beam refinement phase;
    a receive interface configured to:
        obtain a third frame, during the beam refinement phase, transmitted by the other apparatus, the third frame including a beam refinement protocol (BRP) information element (IE) comprising information indicating a difference between a first time that the second frame was received by the other apparatus and a second time that the first frame was transmitted by the other apparatus, and a first indication of an orientation of departure of the first frame, a second indication of an orientation of arrival of the second frame, or both; and
        obtain, in the first frame or the third frame, a third indication from the other apparatus that the third frame includes the first indication, the second indication, or both; and
    at least one processor coupled with a memory and configured to estimate a location of the apparatus relative to the other apparatus based, at least in part, on the difference between the first time and the second time and on the first indication the second indication, or both.

12. The apparatus of claim 11, wherein the processing system is configured to determine a round trip time (RTT) based on at least one of: the difference between the first time and the second time, a time the first frame was received, or a time the second frame was transmitted or a known location of the other apparatus.

13. The apparatus of claim 11, wherein the processing system is configured to estimate an absolute location of the other apparatus, based on the estimated location of the apparatus relative to the other apparatus and a known location of the apparatus.

14. The apparatus of claim 11, wherein the processing system is configured to estimate an absolute location of the apparatus, based on the estimated location of the apparatus relative to the other apparatus and a known location of the other apparatus.

15. The apparatus of claim 11, wherein the processing system is configured to
obtain, from the first frame, a fourth indication of an orientation of departure for a frame previously transmitted by the other apparatus; and
estimate the location of the apparatus relative to the other apparatus based, at least in part on the fourth indication.

16. The apparatus of claim 11, wherein the processing system is configured to provide, to the other apparatus, capability information indicating the apparatus is capable of understanding the first indication the second indication, or both.

17. The apparatus of claim 16, wherein the processing system is configured to:
determine that the third frame includes the first indication the second indication, or both based on the third indication; and
process the third frame based on the determination.

18. The Apparatus of claim 11, wherein the at least one processor coupled with the memory is further configured to perform a beam training phase.

19. A method for wireless communications by an apparatus, comprising:
outputting a first frame for transmission to another apparatus during a beam refinement phase;
obtaining, at a second time, a second frame transmitted by the other apparatus during the beam refinement phase;
generating a third frame, during the beam refinement phase, for transmission to the other apparatus via the transmit interface, the third frame including a beam refinement protocol (BRP) information element (IE) comprising information indicating a difference between the first time and the second time, and a first indication of an orientation of departure of the first frame, a second indication of an orientation of arrival of the second frame, or both; and
providing, in the first frame or the third frame, a third indication to the other apparatus that the third frame includes the first indication, the second indication, or both.

20. The method of claim 19, wherein the second indication of the orientation of arrival of the second frame is expressed as a first angle in a first plane and a second angle in a second plane.

21. The method of claim 19, wherein the first indication of the orientation of departure of the first frame is expressed as a first angle in a first plane and a second angle in a second plane.

22. The method of claim 19, wherein the third frame comprises both the first indication and the second indication.

23. The method of claim 19, wherein the third frame comprises a value indicative of the difference between the first time and the second time.

24. The method of claim 19, wherein:
the second frame is obtained via a plurality of receive antennas; and
the method further comprises estimating the orientation of arrival of the second frame based on data regarding calibration of the receive antennas.

25. The method of claim 19, wherein:
the second frame is obtained via a plurality of receive antennas; and
the method comprises selectively enabling different combinations of the receive antennas while receiving the second frame and estimating the orientation of arrival of the second frame based on channel estimates for the different combinations of receive antennas.

26. A method for wireless communications by an apparatus, comprising:
obtaining a first frame from another apparatus during a beam refinement phase;
outputting a second frame for transmission to the other apparatus during the beam refinement phase;
obtaining a third frame, during the beam refinement phase, transmitted by the other apparatus, the third frame including a beam refinement protocol (BRP) information element (IE) comprising information indicating a difference between a first time that the second frame was received by the other apparatus and a second time that the first frame was transmitted by the other apparatus, and a first indication of an orientation of departure of the first frame, a second indication of an orientation of arrival of the second frame, or both;
obtaining, in the first frame or the third frame, an indication from the other apparatus that the third frame the first indication, the second indication, or both; and
estimating a location of the apparatus relative to the other apparatus based, at least in part, on the difference between the first time and the second time and on the first indication, the second indication, or both.

27. The method of claim 26, further comprising determining a round trip time (RTT) based on at least one of: the difference between the first time and the second time, a time the first frame was received, or a time the second frame was transmitted or a known location of the other apparatus.

28. The method of claim 26, further comprising estimating an absolute location of the other apparatus, based on the estimated location of the apparatus relative to the other apparatus and a known location of the apparatus.

29. The method of claim 26, further comprising estimating an absolute location of the apparatus, based on the estimated location of the apparatus relative to the other apparatus and a known location of the other apparatus.

30. The method of claim 26, further comprising:
obtaining, from the first frame, a fourth indication of an orientation of departure for a frame previously transmitted by the other apparatus; and
estimating the location of the apparatus relative to the other apparatus based, at least in part on the indication of the orientation of departure for the frame previously transmitted by the other apparatus.

31. The method of claim 26, further comprising providing, to the other apparatus, capability information indicating the apparatus is capable of understanding the first indication the second indication, or both.

* * * * *